US012801157B2

(12) United States Patent
Kumar et al.

(10) Patent No.: US 12,801,157 B2
(45) Date of Patent: Nov. 17, 2026

(54) SYSTEM AND METHOD OF CONTROLLING NAVIGATION OF ROBOT IN DYNAMIC ENVIRONMENT BASED ON HEURISTIC LEARNING

(71) Applicant: AVRIDH TECHNOLOGIES, INC., San Francisco, CA (US)

(72) Inventors: Alok Kumar, Kapurthala (IN); Piyush Thapar, Ludhiana (IN)

(73) Assignee: AVRIDH TECHNOLOGIES, INC.

( * ) Notice: Subject to any disclaimer, the term of this patent is extended or adjusted under 35 U.S.C. 154(b) by 188 days.

(21) Appl. No.: 18/264,720

(22) PCT Filed: Jan. 17, 2022

(86) PCT No.: PCT/IB2022/050344
§ 371 (c)(1),
(2) Date: Aug. 8, 2023

(87) PCT Pub. No.: WO2022/175758
PCT Pub. Date: Aug. 25, 2022

(65) Prior Publication Data
US 2024/0111309 A1 Apr. 4, 2024

(30) Foreign Application Priority Data
Feb. 17, 2021 (IN) ............................ 202111006672

(51) Int. Cl.
*G05D 1/646* (2024.01)
*B25J 9/16* (2006.01)
(Continued)

(52) U.S. Cl.
CPC .............. *G05D 1/646* (2024.01); *B25J 9/163* (2013.01); *G01C 21/206* (2013.01);
(Continued)

(58) Field of Classification Search
CPC .. G05D 1/646; G05D 1/2297; G05D 2107/70; G05D 2109/10; G05D 1/246;
(Continued)

(56) References Cited

U.S. PATENT DOCUMENTS

2005/0222714 A1* 10/2005 Nihei .................. G05B 19/423 700/264
2008/0294288 A1 11/2008 Yamauchi
(Continued)

FOREIGN PATENT DOCUMENTS

JP 4232196 B2 * 3/2009
KR 20130015818 A * 2/2013 ........... G05B 19/423

OTHER PUBLICATIONS

KR-20130015818-A original and machine translatio (Year: 2013).*
(Continued)

*Primary Examiner* — Michael V Kerrigan
*Assistant Examiner* — Zachary E. F. Glade
(74) *Attorney, Agent, or Firm* — Sanders IP Law

(57) ABSTRACT

Disclosed is a system for controlling navigation of a robot in a dynamic environment based on heuristic learning. The system comprising: a heuristic learning unit configured to determine at least a preferred path, a preferred position, and a preferred orientation for the robot based on human robot interaction (HRI) during navigation of the robot and a path scaling factor and a navigation control unit configured to generate at least one of: an optimal path, an optimal position, and an optimal orientation, for navigation of the robot in the dynamic environment in real-time, during navigation of the robot, based on at least one of: the preferred path, the preferred position, the preferred orientation or a previous navigation data associated with the robot.

12 Claims, 6 Drawing Sheets

(51) Int. Cl.

| | |
|---|---|
| ***G01C 21/20*** | (2006.01) |
| ***G05B 13/04*** | (2006.01) |
| ***G05D 1/229*** | (2024.01) |
| ***G05D 1/246*** | (2024.01) |
| ***G05D 1/644*** | (2024.01) |
| ***G05D 107/70*** | (2024.01) |
| ***G05D 109/10*** | (2024.01) |
| ***G06N 5/01*** | (2023.01) |

(52) U.S. Cl.
CPC ......... *G05B 13/041* (2013.01); *G05D 1/2297* (2024.01); *G05D 1/246* (2024.01); *G06N 5/01* (2023.01); *G05B 2219/32092* (2013.01); *G05B 2219/40202* (2013.01); *G05B 2219/40391* (2013.01); *G05D 1/644* (2024.01); *G05D 2107/70* (2024.01); *G05D 2109/10* (2024.01)

(58) Field of Classification Search
CPC .................. G05D 1/644; G05B 13/041; G05B 2219/32092; G05B 2219/40202; G05B 2219/40391; G01C 21/206; G06N 5/01; B25J 9/163
See application file for complete search history.

(56) References Cited

U.S. PATENT DOCUMENTS

| | | | | |
|---|---|---|---|---|
| 2010/0222925 | A1* | 9/2010 | Anezaki | G05D 1/229 700/253 |
| 2014/0121833 | A1* | 5/2014 | Lee | B25J 9/1666 901/1 |
| 2017/0057087 | A1* | 3/2017 | Lee | B25J 9/1666 |
| 2021/0107135 | A1* | 4/2021 | Takeuchi | G05B 19/423 |

OTHER PUBLICATIONS

JP-4232196-B2 original and machine translation (Year: 2009).*
Wang, Jiankun et al, "Optimal Motion Planning for Mobile Robots", IEEE Transactions on Automation Science and Engineering, 2020 (Year: 2020).*
International Search Report issued in International Patent Application No. PCT/IB2022/050344, dated Apr. 21, 2022, 3 pages.
Wang, Jiankun, Max Q-H. Meng, and Oussama Khatib. "EB-RRT: Optimal motion planning for mobile robots." Apr. 30, 2020, pp. 2063-2073.

* cited by examiner

SYSTEM AND METHOD OF CONTROLLING NAVIGATION OF ROBOT IN DYNAMIC ENVIRONMENT BASED ON HEURISTIC LEARNING

TECHNICAL FIELD

The invention generally relates to robot navigation systems, and particularly, to a system and method of controlling navigation of a robot in a dynamic environment based on heuristic learning.

BACKGROUND

Typically, navigation of a robot in a mapped environment requires determining a specific path for the robot to follow. Several known path planning techniques are currently used for navigating robots in mapped environments such as, for example, A*search algorithm, Dijkstra, weighted A*, D* and the like. In order to make A* search algorithm run faster a constant factor is multiplied to heuristic and the corresponding technique is known as weighted A*. The Dijkstra algorithm is low in complexity, and is almost linear.

However, the A* search algorithm does not produce a shortest path always, since the A* search algorithm relies heavily on heuristics or approximations to calculate the path. Also, the A* algorithm considers fixed heuristics to find a path between two nodes of the graph. Additionally, when working with graphs that have negative weights Dijkstra algorithm fails to work properly. Moreover, when the percentage error of heuristic is high the weighted A* pathfinding technique might fail. Several other known navigation techniques use or extract pre-computed heuristics or heuristics based on distance to determine a final goal for navigating the robot. However, optimal path planning remains to be a challenging problem in a highly dynamic environment, since environmental changes are not considered in path planning every time a path is re-planned while using the pre-computed heuristics or heuristics based on distance. Also, learning the exact poses in a high-resolution map is a tedious task since robots might not always follow the same exact poses when navigating around in the surroundings.

Therefore, in light of the aforesaid discussion, there exists a need to overcome the aforementioned drawbacks associated with the existing techniques for controlling navigation of a robot in a dynamic environment.

SUMMARY

The present disclosure seeks to provide a system and a method of controlling navigation of a robot in a dynamic environment based on heuristic learning. The present disclosure seeks to provide a solution to the existing problems of optimal path planning in a dynamic environment, by taking into consideration several environmental changes and learning the exact poses of the robot in a high-resolution map during navigation in the dynamic environment.

The present disclosure seeks to provide a solution to the existing problems of conventional navigation techniques for robots in dynamic environment by controlling navigation of the robot based on heuristic learning.

The object of the present disclosure is achieved by the solutions provided in the description of embodiments. Advantageous implementations of the present disclosure are further defined in the description of embodiments.

In an aspect, the present disclosure provides a system for controlling navigating of a robot in a dynamic environment based on heuristic learning, said system comprising:

- a heuristic learning unit configured to determine at least a preferred path, a preferred position, and a preferred orientation for the robot based on a human robot interaction (HRI) during navigation of the robot and a path scaling factor; and
- a navigation control unit operatively coupled to the heuristic learning unit and configured to generate at least one of: an optimal path, an optimal position, and an optimal orientation, for navigation of said robot in said dynamic environment in real-time, during navigation of the robot, based on at least one of: said preferred path, said preferred position, said preferred orientation or a previous navigation data associated with the robot.

The system of the present disclosure comprises a heuristic learning unit that generates a preferred path, a preferred orientation and a preferred position of a robot in a dynamic environment, based on a human robot interaction (HRI) during navigation of the robot and a path scaling factor. Herein, the term "human robot interaction" refers to any interaction between a human (a user) and the robot including for example, receiving a push from the human to move the robot along a preferred path, recognizing a force feedback, such as for example teleop, human push, and the like, and actuating a movement of the robot in a direction of an applied force by the human to navigate the robot. Herein the term "path scaling factor" refers to a factor that defines the width of a preferred path for navigation of the robot. The heuristic learning unit keeps track of past trails (for example, navigation based on the HRI) of the robot in the dynamic environment and also accepts surrounding data (such as, for example, user knowledge of the environment) as preferred paths from a user explicitly. The system further comprises a navigation control unit operatively coupled to the heuristic learning unit that uses the past trails and the preferred paths for generating an optimal path, an optimal position and an optimal orientation for the robot in the dynamic environment. The inclusion of past data/trails and the surrounding data from the user in path planning takes into consideration any changes in the dynamic environment to determine the navigation path for the robot in real-time during navigation in the dynamic environment, enabling the system to work efficiently and in real-time in any dynamically changing space. The system incorporates learning based on the previous navigation data, user knowledge in terms of preferred paths and also accepts inputs regarding un-preferred areas by the user and thereby the system facilitates producing an optimal path while considering environmental changes in path planning every time a path is re-planned. The system also enables heuristic learning of exact poses (e.g., orientation corresponding to any position) of the robot in a high-resolution map associated with the dynamic environment, based on a path scaling factor. The system generates a preferred path, a preferred position and a preferred orientation of the robot during navigation based on the path scaling factor. Also, the present system allows the users to provide or edit preferred paths that the robots can follow while planning a path towards a destination goal. Moreover, the system enables the robot to take ample number of rounds within the dynamic environment and use the previous navigation data (such as, a past position data and a past orientation data) to learn and subsequently use the previous navigation data in path planning. Also, the present system provides a better overall throughput in finishing the assigned tasks when compared to other known techniques. The system facilitates classifying a navigation map for the robot into mostly busy zones to mostly free ones and that helps to increase the productivity in application areas such as, warehousing or manufacturing lines.

According to an embodiment, the system comprises a drive unit for navigating the robot along the optimal path in the optimal position and the optimal orientation.

According to an embodiment, the drive unit is further configured to navigate the robot based on the HRI by recognizing a force feedback and actuating a drive in a direction of a force applied by a user to navigate the robot.

According to an embodiment, the system comprises a plurality of sensors associated with said robot for sensing at least one of a path, a position, and an orientation of the robot during the navigation of the robot in the dynamic environment and transmitting said path, said position, and said orientation to said heuristic learning unit.

According to an embodiment, the previous navigation data comprises at least a previous path, a previous position, and a previous orientation of the robot corresponding to a plurality of locations within the dynamic environment.

According to an embodiment, the navigation control unit is configured to perform the steps of:

1) placing a cell associated with said dynamic environment in an open list; —2) calculating a potential and heuristic for said cell using a greedy path finding algorithm;
3) determining if the cell is in a preferred cell list;
4) multiplying a preferred path factor and a preferred heuristic factor to a cost and a heuristic of the cell upon the cell being in the preferred cell list;
5) removing the cell from the open list and placing into a closed list and saving an index of the cell associated with the lowest cost, upon the cell not being in the preferred cell list;
6) determining if the cell is a goal cell;
7) terminating the algorithm and using a pointer of indexes to determine at least an optimal path, an optimal position, and an optimal orientation for the robot, upon the cell being a goal cell;
8) detecting a plurality of successors of the cell which do not exist in the closed list, upon the cell not existing in the goal cell; and
9) calculating a potential and a heuristic for each cell from among the plurality of successors of the cell and repeating the steps 3) to 9).

In another aspect, the present disclosure provides a method of controlling navigating of a robot in a dynamic environment based on heuristic learning, said method comprising:

determining, by a heuristic learning unit, at least a preferred path, a preferred position, and a preferred orientation for the robot based on human robot interaction (HRI) during navigation of the robot and a path scaling factor;

generating, by a navigation control unit, at least one of: an optimal path, an optimal position, and an optimal orientation, for navigation of said robot in said dynamic environment in real-time, during navigation of the robot, based on at least one of: said preferred path, said preferred position, said preferred orientation or a previous navigation data associated with the robot; and navigating the robot along said optimal path in said optimal position and said optimal orientation in said dynamic environment by a drive unit.

The method of the present disclosure comprises determining, by a heuristic learning unit, at least a preferred path, a preferred position, and a preferred orientation for the robot based on human robot interaction (HRI) during navigation of the robot and a path scaling factor. Further, the method comprises generating, by a navigation control unit, at least one of: an optimal path, an optimal position, and an optimal orientation, for navigation of the robot in the dynamic environment in real-time, during navigation of the robot, based on at least one of: the preferred path, the preferred position, the preferred orientation or a previous navigation data associated with the robot. Furthermore, the method comprises navigating the robot along the optimal path in the optimal position and the optimal orientation in the dynamic environment by a drive unit. The method enables keeping track of past trails of the robot in the dynamic environment and uses the past trails during path planning in navigation. The method accepts surrounding data (such as, knowledge of the dynamic environment) as preferred paths from a user explicitly and generates an optimal path and orientation for navigation of the robot in the dynamic environment. The inclusion of past data/trails and user knowledge of the environment in path planning takes into consideration any changes in the dynamic environment to determine the navigation path for the robot in real-time during navigation of the robot in the dynamic environment enabling the method to work efficiently and to determine an optimal path for navigation of the robot in any dynamically changing space. The method incorporates learning based on past data, user knowledge in terms of preferred paths and also accepts inputs regarding un-preferred areas by the user and thereby facilitates producing a optimal path while considering environmental changes in path planning every time a path is re-planned. The method also enables learning exact poses (e.g., orientation corresponding to any position) of the robot in a high-resolution map, by using a path scaling factor with the learnt exact positions and orientations of the robot during navigation. Also, the method allows the users to provide/edit preferred paths via the HRI anytime during navigation of the robot that the robots can follow while planning a path towards a destination goal in real-time. Moreover, the method enables the robot take ample number of rounds within the dynamic environment and use the previous navigation data (such as, a past position data and a past orientation data) to learn and subsequently use the previous navigation data in path planning. Also, the method provides a better overall throughput in finishing the assigned tasks when compared to other known techniques. The method facilitates classifying a navigation map for the robot into mostly busy zones to mostly free ones and that eventually helps further to increase the productivity in application areas such as, warehousing or manufacturing lines.

According to an embodiment, generating the optimal path, the optimal position, and the optimal orientation comprises:

1) placing a cell associated with said dynamic environment in an open list; —2) calculating a potential and heuristic for said cell using a greedy path finding algorithm;
3) determining if the cell is in a preferred cell list;
4) multiplying a preferred path factor and a preferred heuristic factor to a cost and a heuristic of the cell upon the cell being in the preferred cell list;
5) removing the cell from the open list and placing into a closed list and saving an index of the cell associated with the lowest cost, upon the cell not being in the preferred cell list;
6) determining if the cell is a goal cell;

7) terminating the algorithm and using a pointer of indexes to determine at least an optimal path, an optimal position, and an optimal orientation for the robot, upon the cell being a goal cell;

8) detecting a plurality of successors of the cell which do not exist in the closed list, upon the cell not existing in the goal cell; and 9) calculating a potential and a heuristic for each cell from among the plurality of successors of the cell and repeating the steps 3) to 9).

According to an embodiment, navigating further comprises navigating based on the HRI by recognizing a force feedback and actuating a drive in a direction of a force applied by a user to navigate said robot.

According to an embodiment, the previous navigation data comprises at least a previous path, a previous position, and a previous orientation of the robot corresponding to a plurality of locations within the dynamic environment.

It has to be noted that all devices, elements, circuitry, units and means described in the present application could be implemented in the software or hardware elements or any kind of combination thereof. All steps which are performed by the various entities described in the present application as well as the functionalities described to be performed by the various entities are intended to mean that the respective entity is adapted to or configured to perform the respective steps and functionalities. Even if, in the following description of specific embodiments, a specific functionality or step to be performed by external entities is not reflected in the description of a specific detailed element of that entity which performs that specific step or functionality, it should be clear for a skilled person that these methods and functionalities can be implemented in respective software or hardware elements, or any kind of combination thereof. It will be appreciated that features of the present disclosure are susceptible to being combined in various combinations without departing from the scope of the present disclosure as defined by the appended claims.

Additional aspects, advantages, features and objects of the present disclosure would be made apparent from the drawings and the detailed description of the illustrative implementations construed in conjunction with the appended claims that follow.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers. Embodiments of the present disclosure will now be described, by way of example only, with reference to the following diagrams wherein:

FIG. 3 exemplarily illustrates an effective change in the navigation path of a robot due to the path scaling factor, in accordance with an embodiment of the present disclose;

FIG. 4 illustrates steps of a method of controlling navigation of a robot in a dynamic environment based on heuristic learning, in accordance with an embodiment of the present disclosure; and FIGS. 5A-5B illustrate steps of a method of generating the optimal path, the optimal position, and the optimal orientation, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

It should be noted that the terms "first", "second", and the like, herein do not denote any order, quantity, or importance, but rather are used to distinguish one element from another. Further, the terms "a" and "an" herein do not denote a limitation.

Additional aspects, advantages, features and objects of the present disclosure will be made apparent from the drawings and the detailed description of the illustrative embodiments construed in conjunction with the appended claims that follow.

It will be appreciated that features of the present disclosure are susceptible to being combined in various combinations without departing from the scope of the present disclosure.

Figure 1:
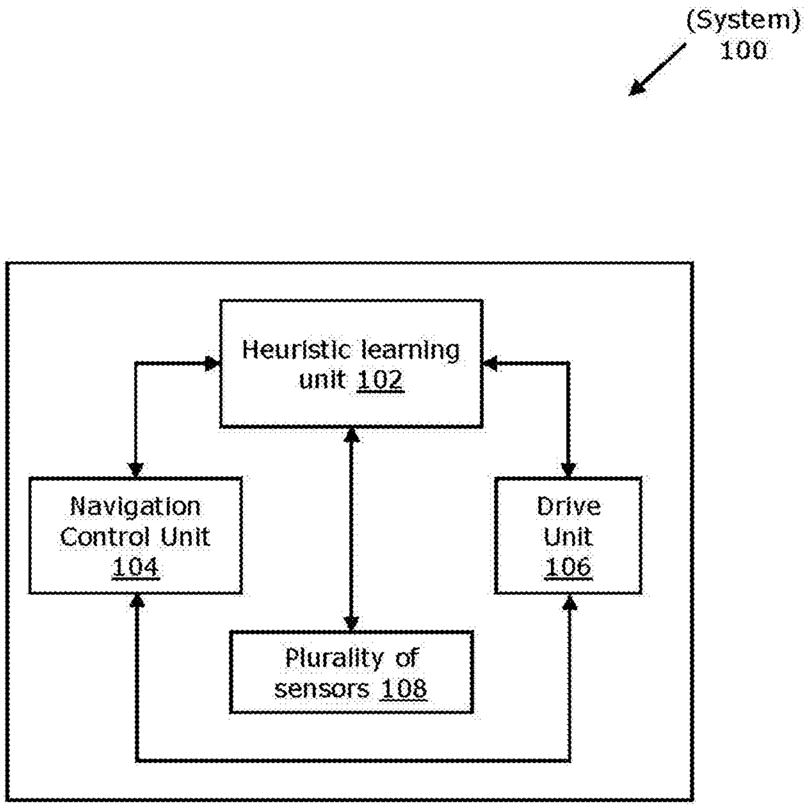
FIG. 1 is a block diagram of a system for controlling navigation of a robot in a dynamic environment based on heuristic learning, in accordance with an embodiment of the present disclosure.

Referring to FIG. 1, illustrated is a block diagram of system 100 for controlling navigation of a robot in a dynamic environment based on heuristic learning. As shown, the system 100 comprises a heuristic learning unit 102, a navigation control unit 104, a drive unit 106, a plurality of sensors 108. Herein, the term "dynamic environment" refers to any navigation space that could undergo dynamic changes with time, including for example, a warehouse or a manufacturing factory space, and the like.

The system 100 comprises the heuristic learning unit 102 configured to determine at least a preferred path, a preferred position, and a preferred orientation for the robot based on a human robot interaction (HRI) during navigation of the robot and a path scaling factor. Herein, the term "human robot interaction" refers to any interaction between a human (a user) and the robot including for example, receiving a push from the human to move the robot along a preferred path, recognizing a force feedback (such as, a teleop, human push, and the like) and actuating a movement of the robot in a direction of a force applied by the human to navigate the robot. Herein the term "path scaling factor" refers to a factor that defines width of a preferred path for navigation of the robot. Typically, when a robot learns a path, the robot learns a set of poses (such as, an orientation of the robot) that lies on the path. The poses together make a line path that restricts the movement of the robot and makes it difficult to follow the exact path. By defining the width of the path, the path scaling factor provides additional degrees of freedom for navigation of the robot along the preferred path. The cost of the actual poses of the path is the lowest whereas the cost of the cell on the extreme ends across the width is the highest (maximum value of the preferred cost is equal to the cost of a free cell).

The heuristic learning unit 102 enables learning exact poses (e.g., orientation corresponding to any position) of the robot in a high-resolution map, by using a path scaling factor with the learnt exact positions and orientations of the robot during navigation. The heuristic learning unit 102 keeps track of past trails (for example, navigation based on the HRI) of the robot in the dynamic environment and also accepts surrounding data (such as, for example, user knowledge of the environment) as preferred paths from a user explicitly. Also, the heuristic learning unit 102 allows the users to provide/edit preferred paths (by for example, the HRI) anytime that the robots can follow while planning a path towards a destination goal.

The heuristic learning unit 102 enables heuristic learning of exact poses (e.g., orientation corresponding to any position) of the robot in a high-resolution map associated with the dynamic environment, based on the path scaling factor. The heuristic learning unit 102 incorporates learning based on the previous navigation data, user knowledge in terms of preferred paths and also accepts inputs regarding un-preferred areas by the user (by for example, the HRI) and thereby facilitates producing an optimal path while considering environmental changes in path planning every time a path is re-planned. Further, the inclusion of past data/trails and the surrounding data from the user in path planning takes into consideration any changes in the dynamic environment to determine the navigation path for the robot in real-time during navigation in the dynamic environment, enabling the system 100 to work efficiently and in real-time in any dynamically changing space.

The system 100 comprises navigation control unit 104 operatively coupled to the heuristic learning unit 102 for generating at least one of: an optimal path, an optimal position, and an optimal orientation, for navigation of the robot in the dynamic environment in real-time, during navigation of the robot, based on at least one of: the preferred path, the preferred position, the preferred orientation or a previous navigation data associated with the robot. The previous navigation data comprises at least a previous path, a previous position, and a previous orientation of the robot corresponding to a plurality of locations within the dynamic environment. The navigation control unit 104, retrieves the previous navigation data associated with past trails of the robot from the heuristic learning unit 102 that keeps track of the past trails and the HRI.

In an embodiment, the navigation control unit 104 performs the steps of 1) placing a cell associated with the dynamic environment in an open list, 2) calculating a potential and heuristic for the cell using a greedy path finding algorithm, 3) determining if the cell is in a preferred cell list, 4) multiply a preferred path factor and a preferred heuristic factor to a cost and a heuristic of the cell upon the cell being in the preferred cell list, 5) removing the cell from the open list and placing into a closed list and saving an index of the cell associated with the lowest cost, upon the cell not being in the preferred cell list, 6) determining if the cell is a goal cell, 7) terminating the algorithm and using a pointer of indexes to determine at least an optimal path, an optimal position, and an optimal orientation for the robot, upon the cell being a goal cell, 8) detecting a plurality of successors of the cell which do not exist in the closed list, upon the cell not existing in the goal cell, and 9) calculating a potential and a heuristic for each cell from among the plurality of successors of the cell and repeating the steps 3) to 9). Herein, the term "greedy path finding algorithm" refers to any algorithm that follows the problem-solving heuristic of making the locally optimal choice at each stage. A greedy heuristic may yield locally optimal solutions that approximate a globally optimal solution in a reasonable amount of time. For example, a greedy strategy for the travelling salesman problem (which is of a high computational complexity) is the following heuristic: "At each step of the journey, visit the nearest unvisited city." Herein, the term "preferred path factor" refers to a factor that is responsible for affecting the cost of the cell where lower the cost more preferable the cell and the term "preferred heuristic factor" refers to a factor that determines selection of neighbouring cells based on heuristics by a planner. Herein, the term "cell" refers to each individual unit that the navigation space (dynamic environment) is discretized into for path planning. The navigation space is discretised or transformed into a grid of cells and the grid of cells are used for path planning computations.

The navigation control unit 104 enables keeping track of past trails of the robot in the dynamic environment and uses the past trails during path planning during navigation and generates an optimal path and orientation for navigation of the robot in the dynamic environment. The inclusion of past data/trails and user knowledge of the environment in path planning takes into consideration any changes in the dynamic environment to determine the navigation path for the robot in real-time during navigation of the robot in the dynamic environment. The navigation control unit 104 enables determining an optimal path for navigation of the robot in any dynamically changing space in an efficient manner.

The system 100 further comprises a drive unit 106 operatively coupled to the navigation control unit 104, and configured to navigate the robot along the optimal path in the optimal position and the optimal orientation. The drive unit 106 is further configured to navigate the robot based on the HRI by recognizing a force feedback such as for example teleop, human push, and the like and actuating a drive in a direction of a force applied by a user to navigate the robot.

The system 100 further comprises a plurality of sensors 108 associated with the robot for sensing at least one of a path, a position, and an orientation of the robot during the navigation of the robot in the dynamic environment and transmitting the path, position, and the orientation to the heuristic learning unit 102. The plurality of sensors 108 enable the heuristic learning unit 102 to keep track of past trails of the robot in the dynamic environment and also receiving preferred paths by the user via the HRI. Examples of the plurality of sensors 108 includes, but is not limited to, cameras, lidars, inertial measurement unit (IMU), ultrasonic sensors, and the like. In another implementation, the heuristic learning unit 102, the navigation control unit 104, and the drive unit 106 are potentially implemented as a software component or a combination of software and circuitry.

Figure 2A:
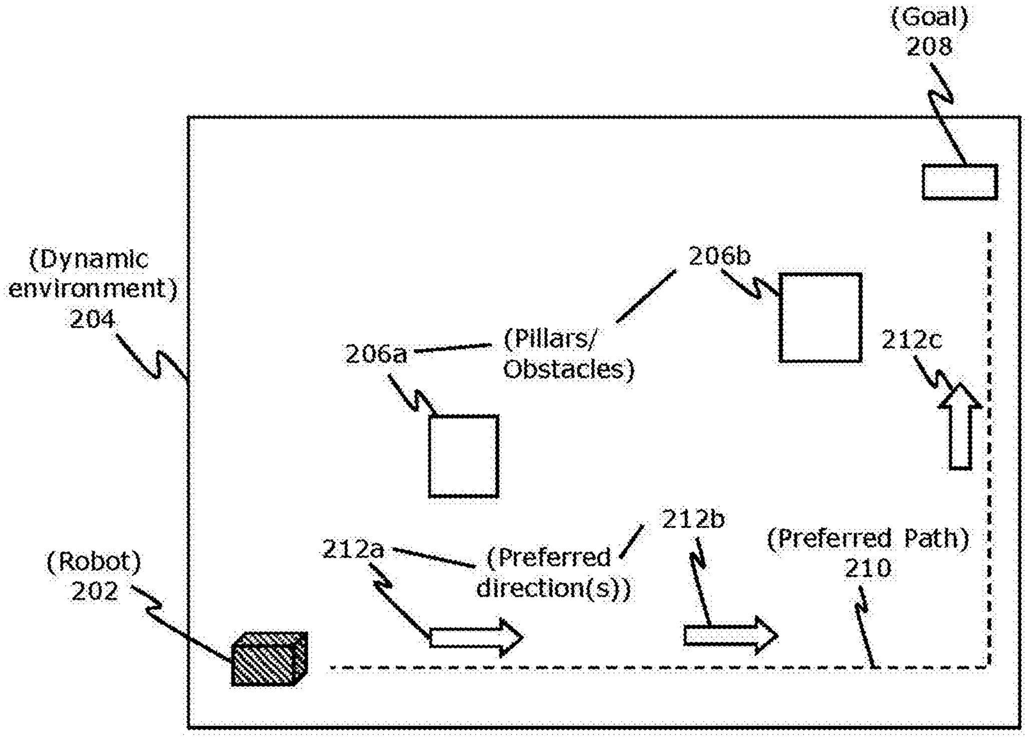
FIGS. 2A-2E illustrate an example scenario of controlling navigation of a robot in a dynamic environment based on heuristic learning by the system of the present disclosure, in accordance with an embodiment of the present disclosure.
Figure 2B:
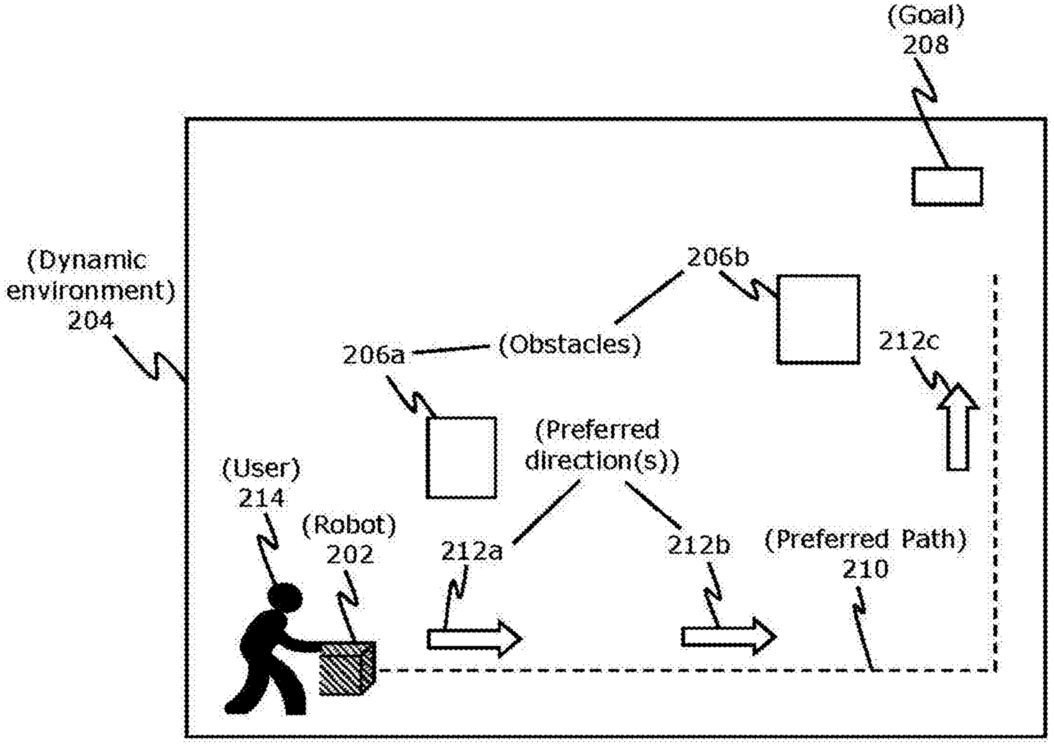
Figure 2C:
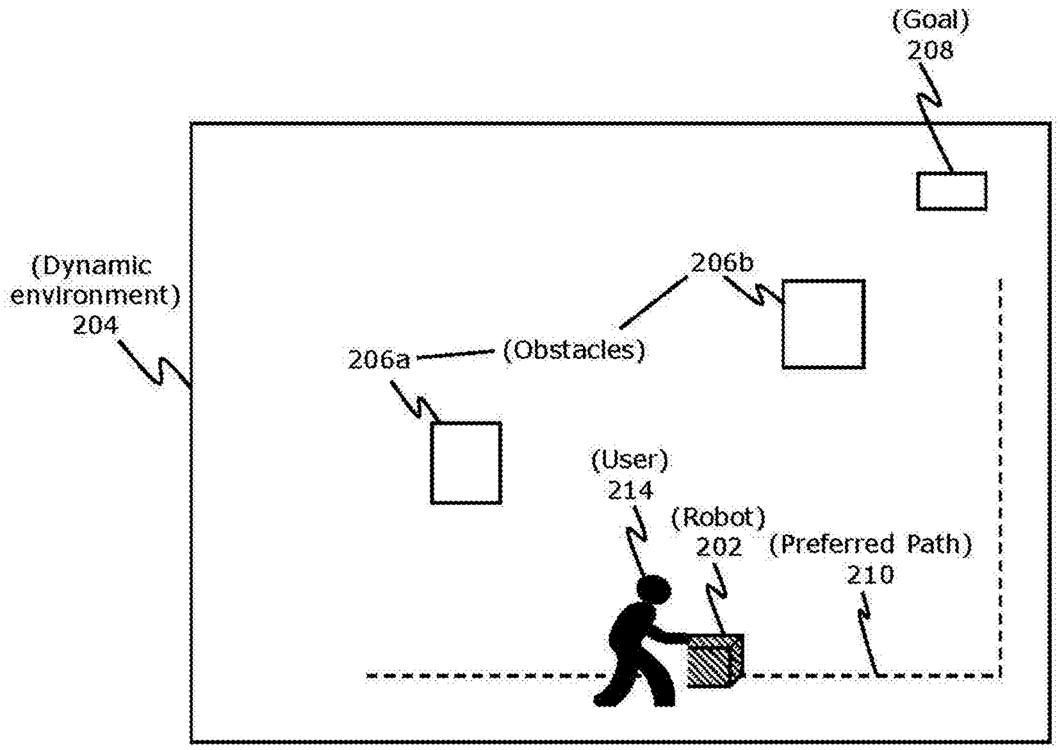
Figure 2D:
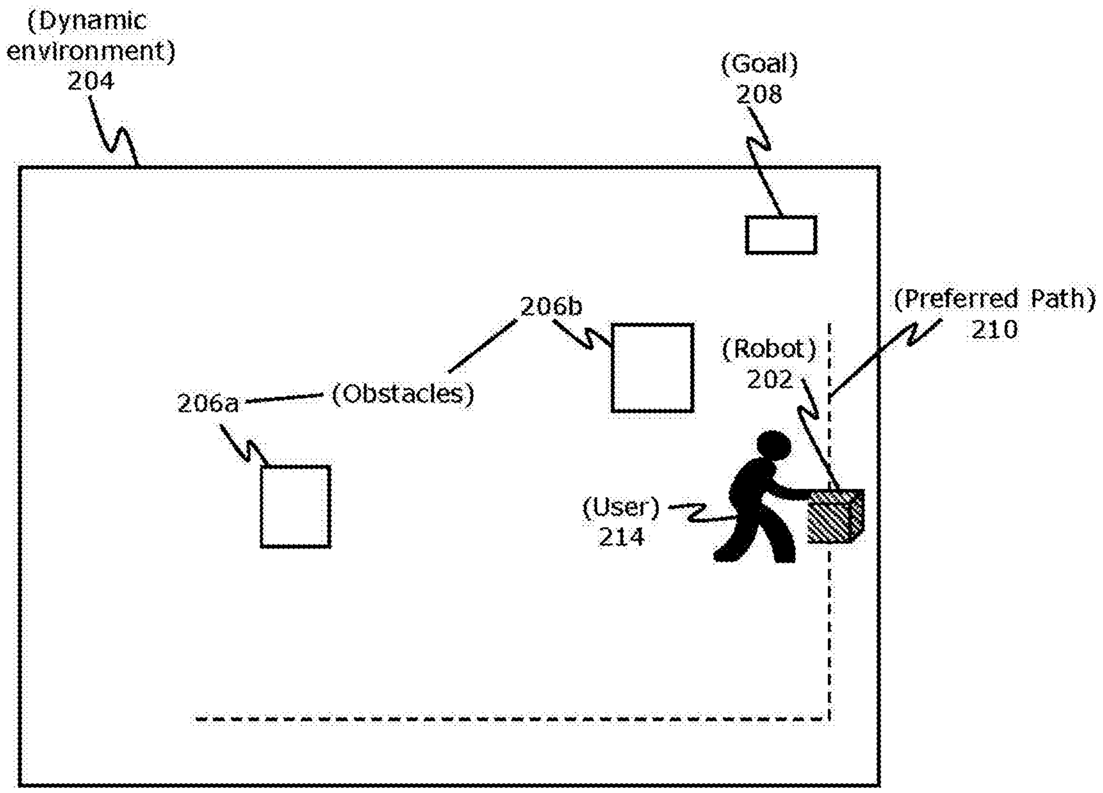
Figure 2E:
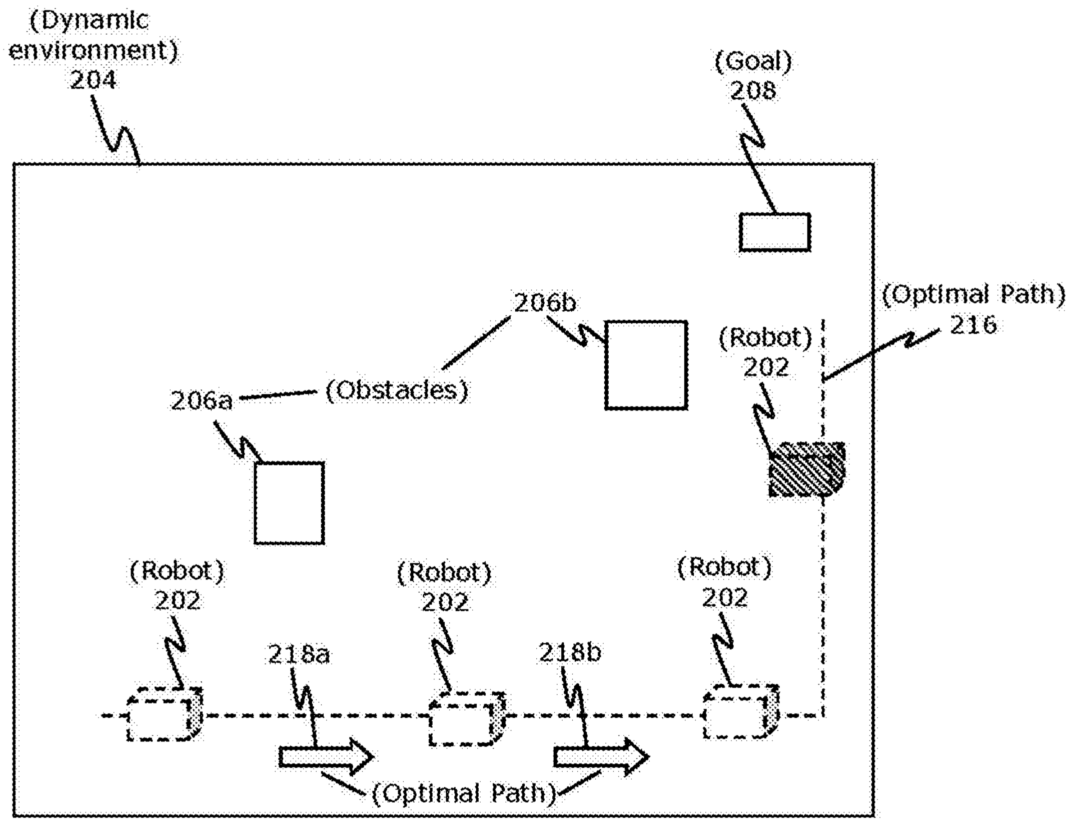

FIGS. 2A to 2E illustrate an example scenario of controlling navigation of a robot 202 in a dynamic environment 204 based on heuristic learning by the system 100 of the present disclosure, in accordance with an embodiment of the present disclosure. Referring now to FIG. 2A, FIG. 2A depicts the dynamic environment 204 comprising two pillars (or obstacles) 206*a* and 206*b*. In an example scenario, in order to navigate the robot 202 to a goal 208, it is desirable to navigate the robot 202 along the least expensive path to reach the goal 208 while avoiding any collision with the obstacles 206*a* and 206*b*. A preferred path 210 for the robot 202 is indicated by dotted lines and a preferred orientation is indicated by arrows 212*a-c*. In accordance with an exemplary scenario, as depicted in FIGS. 2B-2D, a user (human) 214 pushes the robot 202 along the preferred path 210 in the preferred direction (or orientation) along 212*a-c* to provide a preferred route and orientation for the robot 202. FIGS. 2B-2D depict movement of the user 214 along with the robot 202 along the preferred path 210. The robot 202 learns the preferred path 210 and the preferred orientation 212*a-c* based on the navigation guided by the user 214 and determines an optimal path, an optimal position and an optimal orientation to reach the goal 208 for any subsequent navigation in the dynamic environment 204 based on the preferred path 210 and the preferred orientation 212*a-c* and a path scaling factor. FIG. 2E depicts the robot 202 subsequently navigating along the optimal path 216 along the optimal direction 218*a-b* to reach the goal 208.

FIG. 3 exemplarily illustrates an effective change in the navigation path of a robot 202 due to the path scaling factor, in accordance with an embodiment of the present disclose. As depicted in FIG. 3, a first navigation path 302 corresponds to a navigation path of the robot 202 obtained through known techniques without a path scaling factor and a second navigation path 304 corresponds to a navigation path of the robot obtained using the path scaling factor and the system 100 of the present technology. As depicted in FIG. 3, the second navigation path 304 includes an additional width (indicated by the dotted portion) corresponding to additional degrees of freedom allowed for navigation of the robot 202 along a preferred path. By defining the width of the preferred path (i.e., the second navigation path 304), the present system 100 provides additional degrees of freedom for navigation of the robot 202 along the preferred path by employing the path scaling factor. The cost of the actual poses (e.g., orientations of the robot 202) along the second navigation path 304 is the lowest whereas the cost of the cell on the extreme ends across the width of the second navigation path 304 is the highest (maximum value of the preferred cost is equal to the cost of a free cell).

FIG. 4 illustrates steps of a method of controlling navigation of a robot 202 in a dynamic environment 204 based on heuristic learning, in accordance with an embodiment of the present disclosure. At step 402, at least a preferred path, a preferred position, and a preferred orientation for the robot 202 is determined by a heuristic learning unit 102, based on a human robot interaction (HRI) during navigation of the robot 202 and a path scaling factor. At step 404, at least one of: an optimal path, an optimal position, and an optimal orientation, for navigation of the robot 202 in the dynamic environment 204 is generated in real-time, by a navigation control unit 104, during navigation of the robot 202, based on at least one of: the preferred path, the preferred position, the preferred orientation or a previous navigation data associated with the robot 202. At step 406, the robot 202 is navigated along the optimal path in the optimal position and the optimal orientation in the dynamic environment 204 by a drive unit 106.

FIGS. 5A-5B illustrate steps of a method of generating the optimal path, the optimal position, and the optimal orientation, in accordance with an embodiment of the present disclosure. At step 502, a free cell associated with the dynamic environment 204 is placed in an open list. At step 504, a potential and a heuristic is calculated for the cell using a greedy path finding algorithm. At step 506, it is determined if the cell is in a preferred cell list. At step 508, a preferred path factor and a preferred heuristic factor is multiplied to a cost and a heuristic of the cell upon the cell being in the preferred cell list. At step 510, the cell is removed from the open list and placing into a closed list and saving an index of the cell associated with the lowest cost, upon the cell not being in the preferred cell list. At step 512, it is determined if the cell is a goal cell. At step 514, the algorithm is terminated and a pointer of indexes is used to determine at least an optimal path, an optimal position, and an optimal orientation for the robot, upon the cell being a goal cell. At step 516, a plurality of successors of the cell which do not exist in the closed list are detected upon the cell not existing in the goal cell. At step 518, a potential and a heuristic for each cell is calculated from among the plurality of successors of the cell and the steps 506 to 518 are repeated. The steps 502 to 518 are performed by the navigation control unit 104 of the system 100.

Various embodiments of the present technology can be used in various applications requiring controlling navigation of robot in dynamic environments, for example in warehousing, manufacturing line, and the like. The present technology can be user to classify navigation map associated with the dynamic environments, into mostly busy zones to mostly free ones and which eventually helps further to increase the productivity in application areas such as warehousing or manufacturing lines.

The embodiments herein can include both hardware and software elements. The embodiments that are implemented in software include but are not limited to, firmware, resident software, microcode, etc. Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random-access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, Subscriber Identity Module (SIM) card, and cache memories which provide temporary storage of at least some program code in order to reduce the number of times code must be retrieved from bulk storage during execution. Input/output (I/O) devices (including but not limited to keyboards, displays, pointing devices, remote controls, camera, microphone, temperature sensor, accelerometer, gyroscope, etc.) can be coupled to the system either directly or through intervening I/O controllers.

The system, method, computer program product, and propagated signal described in this application may, of course, be embodied in hardware; e.g., within or coupled to a Central Processing Unit ("CPU"), microprocessor, microcontroller, System on Chip ("SOC"), or any other programmable device. Additionally, the system, method, computer program product, and propagated signal may be embodied in software (e.g., computer readable code, program code, instructions and/or data disposed in any form, such as source, object or machine language) disposed, for example, in a computer usable (e.g., readable) medium configured to store the software. Such software enables the function, fabrication, modelling, simulation, description and/or testing of the apparatus and processes described herein.

Such software can be disposed in any known computer usable medium including semiconductor, magnetic disk, optical disc (e.g., CD-ROM, DVD-ROM, and the like) and as a computer data signal embodied in a computer usable (e.g., readable) transmission medium (e.g., carrier wave or any other medium including digital, optical, or analog-based medium). As such, the software can be transmitted over communication networks including the Internet and intranets. A system, method, computer program product, and propagated signal embodied in software may be included in a semiconductor intellectual property core (e.g., embodied in HDL) and transformed to hardware in the production of integrated circuits. Additionally, a system, method, computer program product, and propagated signal as described herein may be embodied as a combination of hardware and software.

A "computer-readable medium" for purposes of embodiments of the present invention may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory.

A "processor" or "process" includes any human, hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural. It is appreciated that certain features of the present disclosure, which are, for clarity, described in the context of separate embodiments, may also be provided in combination in a single embodiment. Conversely, various features of the invention, which are, for brevity, described in the context of a single embodiment, may also be provided separately or in any suitable combination or as suitable in any other described embodiment of the disclosure.

The invention claimed is:

1. A system for controlling navigation of a robot in a dynamic environment based on heuristic learning, the system comprising:

a heuristic learning unit configured to;

determine at least a preferred path, a preferred position, and a preferred orientation for the robot based on human robot interaction (HRI) during navigation of the robot and a path scaling factor, wherein the HRI is an interaction between a human and the robot, comprising at least receiving a physical force-based interaction from the human to navigate the robot along the preferred path, wherein the heuristic learning unit learns the preferred path and the preferred orientation based on the navigation guided by the human;

track past navigation trails performed based on the physical force-based interaction during navigation of the robot; and determine the preferred path based on the tracked past navigation trails and the path scaling factor, the path scaling factor defining a width of the preferred path; and a navigation control unit operatively coupled to the heuristic learning unit and configured to generate at least one of: an optimal path, an optimal position, and an optimal orientation, for navigation of the robot in the dynamic environment in real-time, during navigation of the robot, based on at least one of: the preferred path, the preferred position, the preferred orientation or a previous navigation data associated with the robot, wherein the previous navigation data comprises at least a previous path, a previous position, and a previous orientation of the robot corresponding to a plurality of locations within the dynamic environment and wherein the navigation control unit retrieves the previous navigation data associated with past trails of the robot from the heuristic learning unit.

2. The system as claimed in claim 1, further comprising a drive unit operatively coupled to the navigation control unit, and configured to navigate the robot along the optimal path in the optimal position and the optimal orientation.

3. The system as claimed in claim 2, wherein the drive unit is further configured to navigate the robot based on the HRI, by recognizing a force feedback and actuating a drive in a direction of a force applied by the user to navigate the robot.

4. The system as claimed in claim 1, further comprising a plurality of sensors associated with the robot for sensing at least one of a path, a position, and an orientation of the robot during the navigation of the robot in the dynamic environment and transmitting the path, the position, and the orientation to the heuristic learning unit.

5. The system as claimed in claim 1, wherein the navigation control unit is configured to perform the steps of:

placing a cell associated with the dynamic environment in an open list;

calculating a potential and heuristic for the cell using a greedy path finding algorithm;

determining if the cell is in a preferred cell list;

multiply a preferred path factor and a preferred heuristic factor to a cost and a heuristic of the cell upon the cell being in the preferred cell list;

removing the cell from the open list and placing into a closed list and saving an index of the cell associated with the lowest cost, upon the cell not being in the preferred cell list; and determining if the cell is a goal cell.

6. The system as claimed in claim 5, wherein the navigation control unit is further configured to perform terminating the algorithm and using a pointer of indexes to determine at least an optimal path, an optimal position, and an optimal orientation for the robot, upon the cell being the goal cell.

7. The system as claimed in claim 5, wherein the navigation control unit is further configured to perform detecting a plurality of successors of the cell which do not exist in the closed list, upon the cell not existing in the goal cell.

8. A method of controlling navigation of a robot in a dynamic environment based on heuristic learning, the method comprising:

determining, by a heuristic learning unit, at least a preferred path, a preferred position, and a preferred orientation for the robot based on a human robot interaction (HRI) during navigation of the robot and a path scaling factor, wherein the HRI is an interaction between a human and the robot, comprising at least receiving a physical force-based interaction from the human to navigate the robot along the preferred path, wherein the heuristic learning unit learns the preferred path and the preferred orientation based on the navigation guided by the human;

tracking, by the heuristic learning unit, past navigation trails performed based on the physical force-based interaction during navigation of the robot; and determining, by the heuristic learning unit, the preferred path based on the tracked past navigation trails and the path scaling factor, the path scaling factor defining a width of the preferred path;

generating, by a navigation control unit at least one of: an optimal path, an optimal position, and an optimal orientation, for navigation of the robot in the dynamic environment in real-time, during navigation of the robot, based on at least one of: the preferred path, the preferred position, the preferred orientation or a previous navigation data associated with the robot, wherein the previous navigation data comprises at least a previous path, a previous position, and a previous orientation of the robot corresponding to a plurality of locations within the dynamic environment;

retrieving, by the navigation control unit, the previous navigation data associated with past trails of the robot from the heuristic learning unit; and navigating the robot along the optimal path in the optimal position and the optimal orientation in the dynamic environment by a drive unit.

9. The method as claimed in claim 8, wherein generating the optimal path, the optimal position, and the optimal orientation comprises:

placing a cell associated with the dynamic environment in an open list;

calculating a potential and heuristic for the cell using a greedy path finding algorithm;

determining if the cell is in a preferred cell list;

multiplying a preferred path factor and a preferred heuristic factor to a cost and a heuristic of the cell upon the cell being in the preferred cell list;

removing the cell from the open list and placing into a closed list and saving an index of the cell associated with the lowest cost, upon the cell not being in the preferred cell list; and determining if the cell is a goal cell.

10. The method as claimed in claim 9, wherein generating the optimal path, the optimal position, and the optimal orientation further comprises terminating the algorithm and using a pointer of indexes to determine at least the optimal path, the optimal position, and the optimal orientation for the robot, upon the cell being the goal cell.

11. The method as claimed in claim 9, wherein generating the optimal path, the optimal position, and the optimal orientation further comprises detecting a plurality of successors of the cell which do not exist in the closed list, upon the cell not existing in the goal cell.

12. The method as claimed in claim 8, wherein navigating the robot further comprises navigating the robot based on the HRI by recognizing a force feedback and actuating a drive in a direction of a force applied by the user to navigate the robot.

* * * * *